(12) United States Patent
Li et al.

(10) Patent No.: US 9,320,061 B2
(45) Date of Patent: Apr. 19, 2016

(54) BROADBAND DIGITAL TRUNKING SERVICE IMPLEMENTATION METHOD AND TRUNKING SCHEDULING MANAGEMENT CENTRE

(71) Applicant: ZTE CORPORATION, Shenzhen, Guangdong Province (CN)

(72) Inventors: Qun Li, Shenzhen (CN); Ding Ding, Shenzhen (CN); Zijiang Ma, Shenzhen (CN); Shouyong Zhang, Shenzhen (CN); Gaopeng Du, Shenzhen (CN); Zhi Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/395,825

(22) PCT Filed: May 6, 2013

(86) PCT No.: PCT/CN2013/075217
§ 371 (c)(1),
(2) Date: Oct. 21, 2014

(87) PCT Pub. No.: WO2013/166950
PCT Pub. Date: Nov. 14, 2013

(65) Prior Publication Data
US 2015/0087298 A1    Mar. 26, 2015

(30) Foreign Application Priority Data
May 7, 2012   (CN) .......................... 2012 1 0137749

(51) Int. Cl.
*H04W 4/00* (2009.01)
*H04W 76/00* (2009.01)
*H04L 29/08* (2006.01)
*H04W 4/06* (2009.01)

(52) U.S. Cl.
CPC ........... *H04W 76/002* (2013.01); *H04L 67/325* (2013.01); *H04W 4/06* (2013.01)

(58) Field of Classification Search
None
See application file for complete search history.

(56) References Cited

FOREIGN PATENT DOCUMENTS

| CN | 101247553 | A | * | 8/2008 | .......... | H04W 72/005 |
|----|-----------|---|---|--------|-----------|--------------|
| CN | 101247553 | A |   | 8/2008 | | |
| CN | 101616364 | A |   | 12/2009 | | |
| CN | 101835274 | A |   | 9/2010 | | |
| CN | 101860973 | A |   | 10/2010 | | |
| CN | 101860973 | A | * | 10/2010 | | |
| CN | 102036187 | A |   | 4/2011 | | |
| CN | 102088662 | A |   | 6/2011 | | |
| WO | 2012051857 | A1 |   | 4/2012 | | |

* cited by examiner

*Primary Examiner* — Adolf Dsouza
(74) *Attorney, Agent, or Firm* — Ling Wu; Stephen Yang; Ling and Yang Intellectual Property

(57) ABSTRACT

Disclosed are a broadband digital trunking service implementation method and a trunking scheduling management center. The trunking scheduling management center receives a trunking call establishment request, and sends a network side a trunking bearer establishment request carrying call information and a transmission bearer address according to the trunking call establishment request.

18 Claims, 5 Drawing Sheets

BROADBAND DIGITAL TRUNKING SERVICE IMPLEMENTATION METHOD AND TRUNKING SCHEDULING MANAGEMENT CENTRE

TECHNICAL FIELD

The present document relates to a multimedia broadcast/multicast service, and more particularly, to a broadband digital trunking service implementation method and system, a trunking scheduling management center, a Broadcast Multicast Service Center (BM-SC), a Multimedia Broadcast/Multicast Service Gateway (MBMS-GW), a mobility management entity (MME), a multi-cell/multicast coordination entity (MCE), an evolved NodeB, a user equipment, and a network side device.

BACKGROUND

Long Term Evolution (hereinafter referred to as LTE) is a next-generation mobile broadband network standard defined in the Third Generation Partnership Project (3GPP). Orthogonal frequency division multiplexing (OFDM) is used and the multiple in/multiple output (MIMO) is introduced to simultaneously support 1.25-20 MHz bandwidth, greatly increase the peak data rate and system capacity, and support peak rates of downlink 100 Mbit/s and uplink 50 Mbit/s in the 20 Mhz bandwidth; the flat network architecture enhances the scheduling and radio resource controlling efficiency and shortens the connection delay.

The multimedia broadcast/multicast service (MBMS) has been supported in the third generation mobile communication systems, and the Enhanced Multimedia Broadcast/Multicast Service (eMBMS) designed in the fourth generation mobile communication LTE system is a service with strong applicability in the industry. Its implementation is that an intelligent terminal with video capability receives a digital audio/video service in the form of broadcast/multicast through the physical multicast channel (PMCH). For the eMBMS implementation and networking, the 3GPP protocol standard provides a complete solution.

The Consultative Committee on International Radio (CCIR) names the trunking communication system as "Trunking Communication System", and China translates the Trunking Communication System into "trunking mobile communication system", which is often referred to as trunking communication system or trunking system.

The trunking communication system is designed and developed to meet the users' commanding and scheduling needs in the industry, and is a dedicated wireless communication system for industry-specific applications, the wireless users in the system can share the wireless channels, and commanding and scheduling are taken as the main applications, it is a versatile and high-performance wireless communication system, and has unique group call capability and the feature of fast call, the group can be a single call or a group call, and the single call refers to that the group only has two users, while the group call is that there or more users are within the group. The trunking communication system has the following characteristics compared to the public cellular mobile system:

(1) fast call connection;
(2) the users within a group call share the downlink to multicast receive;
(3) it is the half-duplex communication PTT (Push To Talk) within the group, and a user having the uplink is the user having the talking right in the group, otherwise, the user is a listening user in the group;
(4) support private call and group call;
(5) when calling and speaking, it needs to press and hold the PTT key, and the called does not need to hook.

The trunking communication systems have a wide range of applications in government departments, public securities, emergency communications, electricity, civil aviation, petrochemical, military, and other fields. With the economic development, leasing, logistics, property management and plant manufacturing also increasingly need the trunking communication.

The trunking communication system will also technically develop in the direction of IP system, diversified services, data broadband, and multimode terminal. From the perspective of specific applications, it mainly embodies in the high-speed data, video, and a variety of applications built on this basis.

Therefore, the trunking communication system needs to have larger channel capacity, higher spectrum efficiency, better transmission performance, and with low-cost, scalable, and configurable all-IP wireless multimedia network architecture, it can achieve smooth evolution. The trunking communication is becoming a major dedicated communications system besides of the public mobile communication.

However, as the fourth-generation mobile broadband LTE system, there is no existing solution for trunking communication service.

SUMMARY

The embodiment of the present document provides a broadband digital trunking service implementation method and system, a trunking scheduling management center, a Broadcast Multicast Service Center (BM-SC), a Multimedia Broadcast/Multicast Service Gateway (MBMS-GW), a mobile management entity (MME), a multi-cell/multicast coordination entity (MCE), an evolved NodeB, a user equipment and a network side device, to solve the problem that the existing trunking communication cannot be used as a service to merge into the public cellular mobile system.

The embodiment of the present document provides a broadband digital trunking service implementation method, and said method comprises:

said trunking scheduling management center receiving a trunking call establishment request;

said trunking scheduling management center sending a network side a creating trunking bearer request carrying call information and a transmission bearer address according to said trunking call establishment request.

Preferably, said trunking scheduling management center sending said network side said creating trunking bearer request carrying said call information and said transmission bearer address based on said trunking call establishment request comprises:

said trunking scheduling management center, according to group information carried in said trunking call establishment request, determining playback feature of single call or group call of a trunking serviceat the network side and attributes of user's role in said single call or group call of said trunking service, and sending said network side said creating trunking bearer request carrying said call information and said transmission bearer address.

Preferably, after said trunking scheduling management center sends said network side said creating trunking bearer request, said method further comprising:

said trunking scheduling management center receiving a trunking call establishment response sent by said network side, and sending a call establishment acknowledgement message to users in said trunking service group.

Preferably, said trunking scheduling management center, according to group information carried in said trunking call establishment request, determines the playback feature of said single call or group call of said trunking service at said network side, as well as the attributes of said user's role in said single call or group call of said trunking service, and sends a creating trunking bearer request carrying said call information and said transmission bearer address to said network side, comprising:

said trunking scheduling management center authenticating the user that sends said trunking call establishment request, and after passing said authentication, configuring a service type and a quality of service (QoS) of said trunking service according to the determined playback feature at the network side as well as the attributes of the user's role, and sending said network side a creating trunking bearer request carrying said QoS information and said transmission bearer address.

Preferably, said call establishment acknowledgement prompt information comprises talking-right occupancy information of the group, priority information of the group and priority information of the user with the talking right within the group.

The embodiment of the present document further provides a broadband digital trunking service implementation method, and said method comprises:

a network side receiving a creating trunking bearer request sent by a trunking scheduling management center, and sending said creating trunking bearer request to a user with a talking right in a group;

said network side receiving a trigger request sent by said trunking scheduling management center, and establishing a dedicated or shared radio access bearer for all listening users in said group according to said trigger request.

Preferably, after said network side establishes a dedicated or shared radio access bearer for all the listening users in said group according to said trigger request, said method further comprises:

said network side sending a trunking call establishment response to said trunking scheduling management center.

Preferably, said network side establishing a dedicated or shared radio access bearer for all said listening users in said group according to said trigger request comprises:

said network side establishing a dedicated radio access bearer for said listening user in a single call based on said trigger request; or said network side establishing a downlink shared radio access bearer for said listening users in a group call in accordance with said trigger request.

The embodiment of the present document further provides a trunking scheduling management center, and said trunking scheduling management center comprises:

a receiving module, configured to receive a trunking call establishment request;

a processing module, configured to, according to said trunking call establishment request, send a network side a creating trunking bearer request carrying call information and a transmission bearer address.

Preferably, said processing module is configured to:

according to group information carried in said trunking call establishment request, determine playback feature of single call or group call of a trunking service at said network side, and attributes of user's role in said single call or group call of said trunking service, and send said network side a creating trunking bearer request carrying said call information and said transmission bearer address.

Preferably, said receiving module is further configured to receive a trunking call establishment response sent by said network side;

said processing module is further configured to send a call establishment acknowledgement prompt information to users in said single call or group call of said trunking service.

Preferably, said processing module is configured to:

authenticate the user that sends said trunking call establishment request, and after passing said authentication, configure the service type and quality of service of said trunking service according to the determined playback feature at said network side and the attributes of the user's role, and send said network side a creating trunking bearer request carrying said QOS information and said transmission bearer address.

Preferably, said call establishment acknowledgement prompt information comprises talking right occupancy information of said group, priority information of said group and priority information of the talking user within said group.

The embodiment of the present document further provides a broadcast multicast service center (BM-SC), and said BM-SC comprises:

a converting module, configured to receive a creating trunking bearer request sent by said trunking scheduling management center, and convert the QoS information carried in said creating trunking bearer request into the trunking service's QoS information identifiable by a mobility management entity (MME);

a processing module, configured to generate a trunking service session control signaling and a transmission bearer address of a group call downlink in a multicast mode, and carry said trunking service session control signaling and said transmission bearer address into said creating trunking bearer request, and then send said request to said MME through a multimedia broadcast/multicast service gateway (MBMS-GW).

Preferably, said processing module is further configured to receive a trunking call establishment response from said MME, and return said trunking call establishment response to said trunking scheduling management center.

Preferably, said processing module is further configured to receive a call establishment acknowledgement prompt information returned by said trunking scheduling management center, and send said call establishment acknowledgement prompt information to said MME via said MBMS-GW.

The embodiment of the present document further provides a mobility management entity (MME), and said MME comprises:

an interface module, configured to forward a trunking call establishment request from a user equipment to a trunking scheduling management center, and forward a creating trunking bearer request that carries QoS information and is from said trunking scheduling management center to an evolved NodeB and said user equipment via said BM-SC;

a configuring and sending module, configured to receive a trigger request sent by said user equipment after accepting said creating trunking bearer request, and configure transmission bearer information according to said trigger request, and convert said quality of service information into the quality of service information identifiable by said evolved NodeB, and send said evolved NodeB a radio access bearer establishment request carrying said quality of service information identifiable by said evolved NodeB and said transmission bearer information.

Preferably, said configuring and sending module is configured to: if said user equipment is a user equipment of listening users in a group call in the multicast mode, send said radio access bearer establishment request to said evolved NodeB through a multi-cell/multicast coordination entity (MCE); if said user equipment is a wireless mobile device of the talking user in the group or a user equipment of the listening user within a single call in the unicast mode, directly send said evolved NodeB said radio access bearer establishment request.

Preferably, said interface module is further configured to forward a trunking call establishment response from said evolved NodeB to a BM-SC via a MBMS-GW, and send said evolved NodeB a call establishment acknowledgement prompt information from said trunking scheduling management center through said MCE.

The embodiment of the present document further provides a multi-cell/multicast coordination entity (MCE), and said MCE comprises:

a distributing module, configured to, after receiving a radio access bearer establishment request from a mobility management entity (MME), allocate radio resources and scheduling information of said radio resources to a trunking service session;

a sending module, configured to send said radio access bearer establishment request to all the evolved NodeBs controlled by said MCE.

Preferably, said sending module is further configured to receive a call establishment acknowledgement prompt information from said MME, and send said call establishment acknowledgement prompt information to each evolved NodeB that the current trunking service session service area belongs to.

The embodiment of the present document further provides an evolved NodeB, and said evolved NodeB comprises:

an interface module, configured to receive a radio access bearer establishment request that carries quality of service information identifiable by said evolved NodeB and a transmission bearer information and is sent by a mobility management entity (MME);

an establishing module, configured to, according to said radio access bearer establishment request received by said interface module, establish a radio access bearer.

Preferably, said establishing module is configured to, when said evolved NodeB is an evolved NodeB of the group call area in the multicast mode, establish a downlink shared radio access bearer for said group call, and said downlink shared radio access bearer comprises a M1 interface transmission bearer and a radio bearer; map a control plane and a user plane of said radio bearer to logical channels: multicast control channel (MCCH) and multicast traffic control (MTCH), and then via said logical channels to a multicast control channel (MCH), and finally map to a physical multicast channel (PMCH); alternatively, when said evolved NodeB is an evolved NodeB to which the cell in which the user with the talking right in the group or the listening user in the unicast mode is located belongs, establish an uplink and downlink, and said uplink and downlink comprise a S1 interface transmission bearer and a radio bearer, and map the control plane and the user plane of said radio bearer to the uplink logical channels: dedicated control channel (DCCH) and dedicated traffic channel (DTCH), and then map said uplink logical channels DCCH and DTCH to the uplink shared channel (UL-SCH), and finally map to the physical uplink shared channel (PUSCH); correspondingly, map the downlink logical channels DCCH and DTCH to the downlink shared channel (DL-SCH), and finally map to the physical downlink shared channel (PDSCH).

Preferably, said interface module is further configured to, after said establishing module establishes said radio access bearer, send a trunking call establishment response to said MME.

Preferably, said interface module is further configured to receive said call establishment acknowledgement prompt information from said MME, and on the MCCH, notify all users in said group call about said call establishment acknowledgement prompt information, and said call establishment acknowledgement prompt information comprises the talking right occupied information, talking right idle information, the priority information of the user with talking right, and the priority information of the group.

The embodiment of the present document further provides a multimedia broadcast/multicast service gateway (MBMS-GW), said MBMS-GW comprises:

an interface module, configured to receive a trunking call establishment request sent by a broadcast multicast service center (BM-SC), and send a creating trunking bearer request carrying a multicast address to a mobile management entity (MME);

a distributing module, configured to, according to said trunking bearer establishment request from said BM-SC, allocate a multicast address to a session.

Preferably, said interface module is further configured to send a trunking call establishment response to said BM-SC, and send said mobile management entity (MME) a call establishment acknowledgement prompt information from said BM-SC.

Preferably, said interface module is further configured to send data come from said BM-SC to each evolved NodeB that the current trunking service session service area belongs to, wherein, said data is media stream that belongs to the user with talking right in the group call and is sent to the trunking scheduling management center.

The embodiment of the present document further provides a network-side device, comprising a broadcast multicast service center (BM-SC), a Multimedia Broadcast/Multicast Service Gateway (MBMS-GW) connected with said BM-SC, a Mobility Management Entity (MME) connected with said MBMS-GW, and a multi-cell/multicast coordination entity (MCE) and an evolved NodeB that are connected with said MME, wherein:

said BM-SC uses the abovementioned BM-SC, said MBMS-GW uses the abovementioned MBMS-GW, said MME uses the abovementioned MME, said MCE uses the abovementioned MCE, and said evolved NodeB uses the abovementioned evolved NodeB.

The embodiment of the present document further provides a user equipment, said user equipment comprises:

an establishing module, configured to, when said user equipment is a wireless mobile device, establish an RRC connection with the evolved NodeB;

a sending module, configured to, after said establishing module establishes said RRC connection, send a trunking call establishment request to said evolved NodeB.

Preferably, said sending module is further configured to, when said user equipment is a wired device, send said trunking call establishment request to said trunking scheduling management center through said wired device.

The embodiment of the present document further provides a broadband digital trunking service implementation system, and said system comprises the abovementioned trunking scheduling management center, the abovementioned network side device and the abovementioned user equipment.

The technical scheme in accordance with the embodiment of the present document, compared to the traditional solution designed in the second-generation mobile communication technology dedicated network trunking communication system, can effectively meet the trunking service bandwidth requirements and improve the transmission efficiency; in addition, applications of the SFN technology well solve problems of interference suppression and interference coordination in networking, and improve the frequency resource utilization; making the applications of the trunking communication service expand from the traditional dedicated network to the mobile public network.

PREFERRED EMBODIMENTS OF THE PRESENT DOCUMENT

Hereinafter with reference to the accompanying figures, the embodiments of the present document will be described in detail. It should be noted that, in the case of no conflict, the embodiments and features in the embodiments of the present application may be arbitrarily combined with each other.

With the rapid development of the trunking communication service, only limiting the trunking service to the second-generation mobile communication technology is far from being able to meet future needs: higher transmission data rate, larger capacity and faster service establishment efficiency. The fourth generation mobile communication technology provides the needs with a good expansion platform. The embodiment of the present document proposes an eMBMS based LTE broadband digital trunking service implementation method, making the trunking communication as an eMBMS service to be applied in the mobile communication network.

Figure 1A:
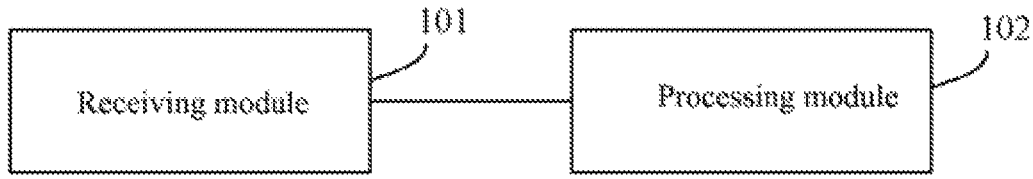
FIG. 1a is a schematic diagram of the structure of a trunking scheduling management center in accordance with an embodiment of the present document.

FIG. 1a is a schematic diagram of the structure of a trunking scheduling management center in accordance with an embodiment the present document, and said trunking scheduling management center comprising receiving module 101 and processing module 102, wherein:

said receiving module 101 is configured to receive a trunking call establishment request;

said processing module 102 is configured to send a creating trunking bearer request carrying the call information and the transmission bearer address to the network side according to said trunking call establishment request.

In addition, said receiving module 101 is further configured to receive a trunking call establishment response sent by said network side; said processing module is further configured to send a call establishment acknowledgement prompt information to users in a trunking service single call or group call. Said call establishment acknowledgement prompt information comprises talking-right occupancy information of the group, priority information of said group, and priority information of the user with talking right within said group.

Preferably, said processing module 102 is configured to: according to the group information carried in said trunking call establishment request, determine the playback feature of said single call or group call of said trunking service at the network side, as well as the attributes of the user's role in said single call or group call of said trunking service, send a creating trunking bearer request carrying said call information to said network side. Wherein, said playback feature comprises a unicast or multicast mode, the attributes of said user's role comprise whether said user is a calling or called party, said call information is used to indicate to establish a radio access bearer for the called user within a single call in the unicast mode or a listening user within a group call in the multicast mode.

Preferably, said processing module 102 is configured to: authenticate the user that sends said trunking call establishment request, after passing said authentication, according to the determined playback feature of said network side as well as the attributes of the user's role, configure the service type and the quality of service of the trunking service, and send said network side a trunking bearer establishment request carrying said service type and said quality of service information of the trunking service and said transmission address bearer.

The abovementioned trunking scheduling management center, by sending said network side a trunking bearer establishment request, makes said network side establish a dedicated or shared bearer for the user based on said trunking bearer establishment request.

Figure 1B:
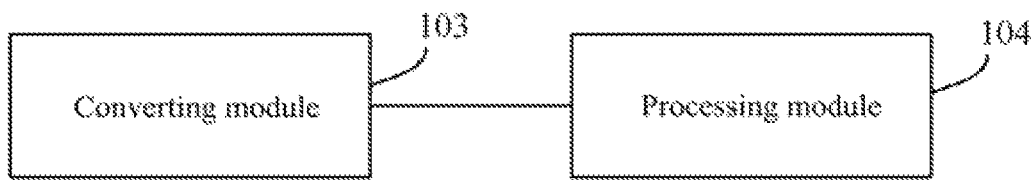
FIG. 1b a schematic diagram of the structure of a BM-SC in accordance with an embodiment of the present document.

As shown in FIG. 1b, it is a schematic diagram of the structure of a BM-SC in accordance with an embodiment of the present document; said BM-SC comprises converting module 103 and processing module 104, wherein:

said converting module 103 is configured to receive a creating trunking bearer request sent by said trunking scheduling management center, convert the quality of service information carried in said trunking bearer establishment request into the trunking service's quality of service information identifiable by said mobile management entity (MME);

said processing module 104 is configured to generate trunking service session control signaling and transmission bearer address of a group call downlink in the multicast mode, carry said trunking service session control signaling and said transmission bearer address into said trunking bearer establishment request, and then send them to said MME through a multimedia broadcast/multicast service gateway (MBMS-GW).

Furthermore, said processing module 104 is further configured to receive a trunking call establishment response from said MME, and return said trunking call establishment response to said trunking scheduling management center.

Preferably, said processing module 104 is further configured to receive a call establishment acknowledgement prompt information returned by said trunking scheduling management center, and send said call establishment acknowledgement prompt information to said MME via said MBMS-GW.

The abovementioned BM-SC sends said creating trunking bearer request received from said trunking scheduling management center to said MME through said MBMS-GW, so that said MME informs the evolved NodeB to establish a dedicated or shared bearer for the user.

Figure 1C:
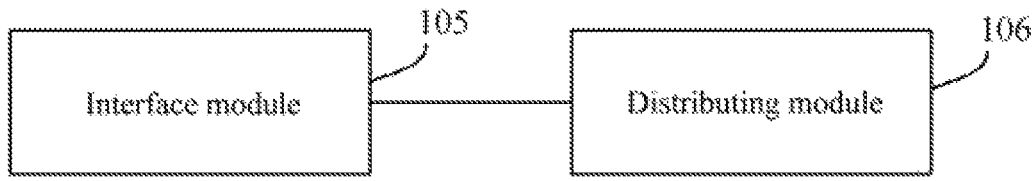
FIG. 1c is a schematic diagram of the structure of a MBMS-GW in accordance with an embodiment of the present document.

As shown in FIG. 1c, it is a schematic diagram of the structure of a MBMS-GW in accordance with the embodiment of the present document, and said MBMS-GW comprises interface module 105 and distributing module 106, wherein:

said interface module 105 is configured to receive a trunking call establishment request sent from said broadcast multicast service center (BM-SC), and send a creating trunking bearer request carrying the multicast address to said mobile management entity (MME);

said distribution module 106 is configured to allocate a multicast address for the session based on said creating trunking bearer request from said BM-SC.

Furthermore, said interface module 105 is further configured to send a trunking call establishment response to said BM-SC, and send a call establishment acknowledgement prompt information from said BM-SC to said mobile management entity (MME).

Preferably, said interface module 105 is further configured to, send data come from said BM-SC to each evolved NodeB to which the current trunking traffic session service area belongs to, wherein, said data is the media stream that belongs to the user with the talking right in the group call and is sent by said trunking scheduling management center.

The abovementioned MBMS-GW sends the trunking bearer setup request from said BM-SC to said MME, so that said MME notifies the evolved NodeB to establish a shared bearer for the user.

Figure 1D:
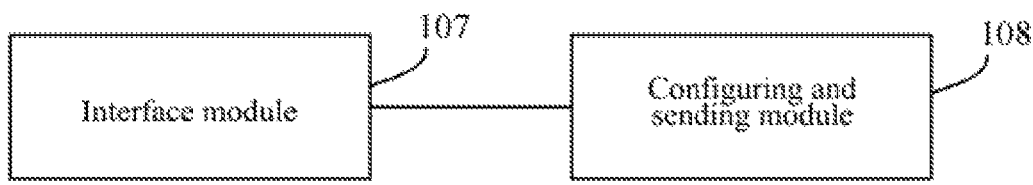
FIG. 1d is a schematic diagram of the structure of a MME in accordance with an embodiment the present document.

As shown in FIG. 1d, it is a schematic diagram of the structure of a MME in accordance with an embodiment of the present document, and said MME comprises interface module 107 and configuring and sending module 108, wherein:

said interface module 107 is configured to forward the trunking call establishment request from said user equipment to said trunking scheduling management center, as well as, forward the creating trunking bearer request that carries the QOS information and is come from said trunking scheduling management center to the evolved NodeB as well as the user equipment through said BM-SC;

said configuring and sending module 108 is configured to receive the trigger request sent by said user equipment after accepting said creating trunking bearer request, configure the transmission bearer information according to said trigger request, and convert said quality of service information into quality of service information that is identifiable by said evolved NodeB, and send said evolved NodeB a radio access bearer establishment request carrying said quality of service information identifiable by said evolved NodeB and said transmission bearer information.

Preferably, said configuring and sending module 108 is configured to: if said user equipment is a user equipment of the listening users within the group call in the multicast mode, send said radio access bearer establishment request to said evolved NodeB via the multi-cell/multicast coordination entity (MCE); if said user equipment is a wireless mobile device of the user with the talking right in the group or a user equipment of the user within the single call in the unicast mode, directly send said radio access bearer establishment request to said evolved NodeB.

Furthermore, said interface module 107 is further configured to forward the trunking call establishment response come from said evolved NodeB to said BM-SC through said MBMS-GW, and send the call establishment acknowledgement prompt information from said trunking scheduling management center to said evolved NodeB through said MCE.

The abovementioned MME receives the creating trunking bearer request sent by said trunking scheduling management center, and directly or indirectly notifies said evolved NodeB to establish a dedicated or shared bearer for the user.

Figure 1E:
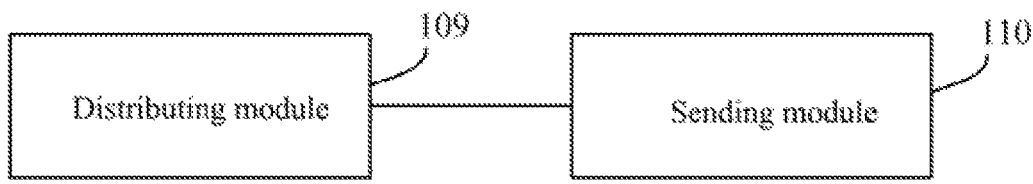
FIG. 1e is a schematic diagram of the structure of a MCE in accordance with an embodiment of the present document.

As shown in FIG. 1e, it is a schematic diagram of the structure of a MCE in accordance with an embodiment of the present document, and said MCE comprises distributing module 109 and sending module 110, wherein:

said distributing module 109 is configured to allocate radio resources and scheduling information of said radio resources to the trunking service session after receiving the radio access bearer establishment request sent from said mobility management entity (MME);

said sending module 110 is configured to send said radio access bearer establishment request to all the evolved NodeBs that are controlled by said MCE.

In addition, said sending module 110 is further configured to receive a call establishment acknowledgement prompt information from said MME, and send said call establishment acknowledgement prompt information to each evolved NodeB to which the current trunking service session service area belongs.

The abovementioned MCE receives a creating bearer establishment request from said MME, and notifies said evolved NodeB to establish a dedicated or shared bearer for the user.

Figure 1F:
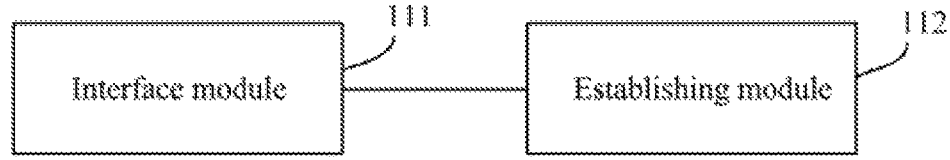
FIG. 1f is a schematic diagram of the structure of an evolved NodeB in accordance with an embodiment of the present document.

As shown in FIG. 1f, it is a schematic diagram of the structure of an evolved NodeB in accordance with an embodiment of the present document, and said evolved NodeB comprises interface module 111 and establishing module 112, wherein:

said interface module 111 is configured to receive a radio access bearer establishment request that is sent by said mobility management entity (MME) and carries the quality of service information identifiable by said evolved NodeB and the transmission bearer information;

said establishing module 112 is configured to establish a radio access bearer according to said radio access bearer establishment request received by said interface module.

Preferably, said establishing module 112 is configured to, when said evolved NodeB is an evolved NodeB of the group call area in the multicast mode, establish a downlink shared radio access bearer for the group call, and said downlink shared radio access bearer comprises the M1 interface transmission bearer and the radio bearer; respectively map the control plane and the user plane to the logical channels: multicast control channel (MCCH) and multicast traffic control (MTCH), and then through the logical channel to the multiple control channel (MCH), and finally map to the physical channel: physical multicast channel (PMCH); alternatively, when said evolved NodeB is an evolved NodeB of the cell in which the user with the talking right in the group and the listening user in the unicast mode is located belongs, establish the uplink and downlink, and said uplink and downlink comprise the S1 interface transmission bearer and the radio bearer, respectively map the control plane and the user plane to the uplink logical channels: dedicated control channel (DCCH) and dedicated traffic channel (DTCH), and then map the uplink logical channels DCCH and DTCH to the uplink shared channel (UL-SCH), and finally to the physical uplink shared channel (PUSCH); correspondingly, map the downlink logical channels DCCH and DTCH to the downlink shared channel (DL-SCH), and finally map them to the physical downlink shared channel (PDSCH).

Furthermore, said interface module is further configured to, after said establishing module establishes the radio access bearer, send a trunking call establishment response to said MME.

Preferably, said interface module is further configured to receive a call establishment acknowledgement prompt information from said MME, and notify said call establishment acknowledgement prompt information to all the users in the group call on said MCCH, said call establishment acknowledgement prompt information comprises the talking right occupied information, the talking right idle information, the priority information of the user with talking right, and the priority information of the group. After the abovementioned evolved NodeB receives a creating bearer establishment request, it establishes a dedicated or shared bearer for the user, so as to make the applications of the trunking communication service expand from the traditional dedicated network to the mobile public network.

The embodiment of the present document provides a network-side device, said network-side device comprises the broadcast multicast service center (BM-SC) shown in FIG. 1b, the multimedia broadcast/multicast service gateway (MBMS-GW) shown in FIG. 1c that is connected with said BM-SC, the mobility management entity (MME) shown in FIG. 1d that is connected with said MBMS-GW, the MCE shown in FIG. 1e and the evolved NodeB shown in FIG. 1f that are connected with said MME.

Said network side device, by interacting with said trunking scheduling management center, establishes a dedicated or shared bearer for the user, so as to make the applications of the trunking communications service expand from the traditional dedicated network to the mobile public network.

The embodiment of the present document further provides a user equipment, and said user equipment comprises an establishing module and a sending module, wherein:

said establishing module is configured to, when said user equipment is a wireless mobile device, establish an RRC connection with the evolved NodeB;

said sending module is configured to, after said establishing module establishes the RRC connection, send a trunking call establishment request to said evolved NodeB.

In addition, said sending module is further configured to, when said user equipment is a wired device, send said trunking call establishment request to said trunking scheduling management center via said wired device.

In the following, different embodiments are used to describe the present document in detail:

Device Embodiment

Figure 2:
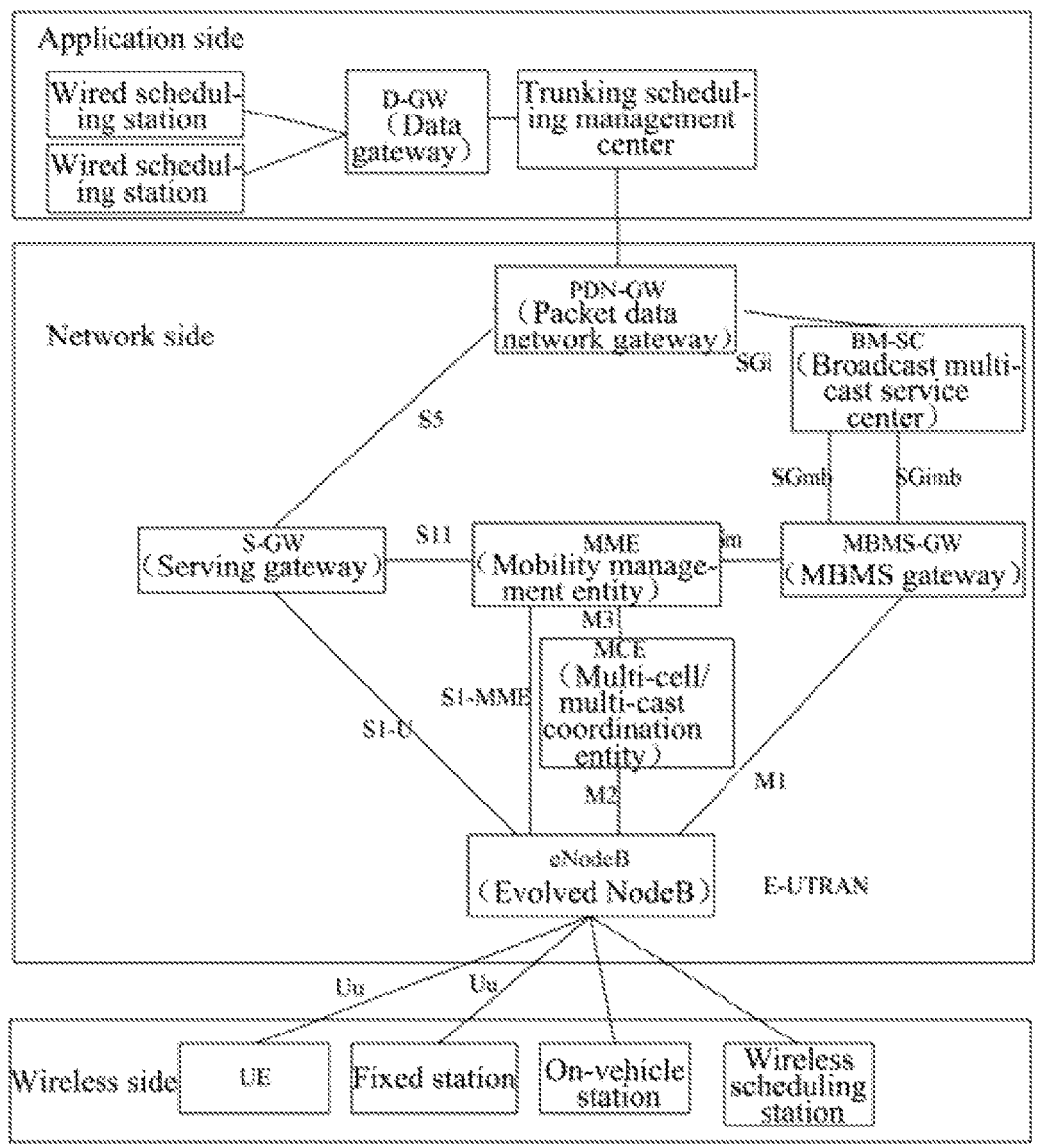
FIG. 2 is a logic chart of achieving the trunking service LTE system in accordance with an embodiment of the present document.

As shown in FIG. 2, it is a schematic diagram of the logical architecture for achieving the trunking service LTE system in accordance with the embodiment of the present document, and said system comprises an application-side device, a network-side device and a wireless-side device, which will be described in the following;

(A) application-side device

The present embodiment provides an application side device for implementing the trunking service, comprising a trunking scheduling management center;

said trunking scheduling management center is configured to, after receiving the trunking call establishment request, authenticate the user that requests said trunking call, as well as authorize and manage the trunkings single call/group call, and also is used to encapsulate the call information of said group call into the trunking service response, then send the trunking service response and the creating trunking bearer request to the wireless network side and the wireless mobile device; said call information comprises: service type, maximum rate and minimum rate provided for the service, priority of service, group call service area, the entity address of the requesting user in the MME, and so on;

the trunking scheduling management center is further configured to update the trunking call status information after receiving said trunking call establishment response, and for the group call service, said trunking scheduling management center further returns a trunking service session acceptance, said trunking service session acceptance passes through the BM-SC (Broadcast Multicast Service Center), the MBMS-GW (MBMS gateway) and the MME (Mobility management Entity) and is sent to the MCE; the trunking service session acceptance of the user with the talking right in the group call as well as the called user within the single call is notified to the user through the trunking service radio access bearer.

The trunking scheduling management center determines the playback feature of said trunking service at the wireless network side based on the single call or group call service of said trunking call establishment request. If said playback feature is the multicast mode, the listening user link that supports the trunking service group call is a point to multi-point transport multicast link based on the eMBMS, when said user with the talking right that supports the trunking service group call is a wireless mobile device, its link is an unicast link; if the playback feature is the unicast mode, when the user with the talking right and the listening user that support the trunking service group call are wireless mobile devices, their links are unicast links.

(B) network-side device

The present embodiment provides a network-side device for implementing trunking service, comprising a BM-SC, a MME, a MBMS-GW, an eNB, and a MCE; wherein:

said BM-SC is configured to accept the trunking service session control information from said trunking scheduling management center, convert the QOS of said trunking service of said trunking scheduling management center into the trunking service's QOS information identifiable by said MME; generate the trunking service session control signaling and the transmission bearer address of the group call downlink in the multicast mode, carry the trunking service session control signaling and the transmission bearer address into the trunking service creating trunking bearer request, and then send said trunking service creating trunking bearer request to the MME through the MBMS-GW; it is further used to return a creating trunking service session control information response to said trunking scheduling management center;

said MME is configured to receive and forward said trunking call establishment request to said trunking scheduling management center; and is further used to create a trunking bearer request and configure the transmission bearer information, and convert the trunking service's quality of service in the call information into the trunking service's QOS information identifiable by the evolved NodeB, and then send a trunking session establishment startup request, and carry the QOS information and the transmission bearer information, if it is a group call in the multicast mode, send the trunking session establishment startup request of the group call to the MCE to establish the downlink radio access bearer; if it is the user with the talking right in the group call or the single call in the unicast mode, send the controlling trunking service bearer establishment request to the eNB;

said MCE is configured to allocate the radio resources and the scheduling information of the radio resources to the trunking service session after receiving the trunking service session establishment startup request, and then send a trunking session establishment startup request to all the controlling eNBs;

said MCE is further configured to, after receiving said trunking service session acceptance, forward said trunking service session acceptance to each eNB that said trunking traffic session service area belongs to, and said eNB controls to notify all the users within said trunking service group call on the MCCH of each cell: an instruction that the talking right of the group call is occupied.

Said eNB is configured to, after receiving said trunking session establishment startup request, establish a radio access bearer;

For a group call in the multicast mode, all the eNBs that belong to the group call controlling area receive said trunking session establishment startup request, and start the downlink E-RAB bearer establishment process, comprising the M1 interface transmission bearer establishment, and map it to the logical channel MCCH/MTCH, and then to the MCH through the logical channel, and finally map to the physical channel PMCH;

If the user equipment initiating the group call is a wireless mobile device such as a handheld terminal, on-vehicle station and fixed station, or a wireless scheduling station, for a user with talking right in the multicast mode or the called user in the unicast mode, it further comprises: the eNB to which the cell that the user is located at belongs starts up the user's E-RAB bearer establishment process, comprising: establishing the uplink and downlink S1 user plane interface transmission bearer, as well as mapping the uplink logical channel DCCH/DTCH to the UL-SCH and then to the physical channel PUSCH; mapping the downlink control link DCCH to the DL-SCH and then to the physical channel PDSCH.

Said eNB is further configured to, when it is a listening user in the group call, after receiving the trunking service session acceptance, notify the group call prompt information to all the users in the group call on the MCCH, said prompt information comprises a talking right occupied indication, talking right idle, priority information of the user and the group call.

(C) User Equipment

The present embodiment provides a user equipment for implementing the trunking service, and said user equipment may be a wireless mobile device or a wired scheduling station;

said wireless mobile device comprises a handheld terminal, on-vehicle station, fixed station and a radio scheduling station.

Said wireless mobile device is configured to, after establishing the RRC connection establishment with the eNB, initiate a trunking call establishment request, and said trunking call establishment request is sent through said MME to said trunking scheduling management center;

Preferably, said trunking call establishment request may be a group call or single call establishment request, it may also be a trunking service call request.

Said wired scheduling station is configured to send a trunking call establishment request to said trunking scheduling management center through the wired device, and said trunking call establishment request is a group call or single call establishment request.

System Embodiment

The present embodiment provides a system for implementing the trunking service, comprising the abovementioned network side device, the application side device and the user equipment; the functions of the trunking scheduling management center, the network side device and the user equipment are not repeated herein.

The embodiment of the present document provides a broadband digital trunking service implementation method, and said method is described in the perspective of the trunking scheduling management center, and said method comprising:

step 11, the trunking scheduling management center receives a trunking call establishment request;

step 12, the trunking scheduling management center sends the network side a creating trunking bearer request carrying the call information and the transmission bearer address according to the trunking call establishment request.

said step 12 can be: according to the group information carried in said trunking call establishment request, said trunking scheduling management center determines the playback feature of the trunking service single call or group call at the network side, as well as the attributes of the user's role in said single call or group call of said trunking service, send the network side a creating trunking bearer request carrying the call information.

In addition, after said trunking scheduling management center sends said creating trunking bearer request to said network side, said method further comprises: said trunking scheduling management center receives a trunking call establishment response sent by said network side, and send a call establishment acknowledgement prompt information to the users in the trunking service group. Wherein, said call establishment acknowledgement prompt information may comprise the talking right occupancy information of the group, the priority information of the group, and the priority information of the user with the talking right within the group.

Preferably, said trunking scheduling management center authenticates the user that sends the trunking call establishment request, after passing said authentication, according to the determined playback feature at the network side and the attributes of said user's role, configures the service type and the QOS of said trunking service, and sends the network side a creating trunking bearer request carrying the QOS information and the transmission bearer address.

The abovementioned broadband digital trunking service implementation method, by sending the creating trunking bearer request to the network side, makes the network side establish a dedicated or shared bearer for the user based on said trunking bearer setup request, so as to make the applications of the trunking communication service expand from the traditional dedicated network to the mobile public network.

The embodiment of the present document provides a broadband digital trunking service implementation method, and said method is described from the network side, and said method comprises:

step 21, the network side receives the creating trunking bearer request sent by said trunking scheduling management center, and sends said trunking bearer setup request to the user with the talking right in the group;

Preferably, said trunking scheduling management center initiates a dedicated bearer establishment request to the user with the talking right in the group, and starts up another process to establish a radio access bearer for the listening users in the group, and the listening user links comprise the listening user in the single call or the listening users in the group call, the listening user in the single call relies to page the listening user to trigger the listening user to establish a dedicated radio access bearer, while the group call listening user link starts to control the trunking session by triggering the BM-SC;

Moreover, in the implementation, sending the talking user creating trunking bearer request can be sending through the user plane of the default bearer of the user with the talking right at the network side, or sending through the control plane of the user with the talking right at the network side;

Step 22, the network side receives the trigger request sent by said trunking scheduling management center, and establishes a dedicated or shared radio access bearer for all the listening users in the group according to the trigger request.

After said step 22, said method further comprises: said network side sending a trunking call establishment response to said trunking scheduling management center.

Said step 22 can be: the network side establishing a dedicated radio access bearer for the listening user in the single call according to the trigger request; alternatively, the network side establishes a downlink shared radio access bearer for the listening user in the group call in accordance with said trigger request.

In the abovementioned method, according to the creating trunking bearer request received from the trunking scheduling management center, the network side establishes a dedicated or shared bearer for the user, so as to make the applications of trunking communication service expand from the traditional dedicated network to the mobile public network.

In the following, from the point of view of the trunking scheduling management center interacting with the network side, the embodiment of the present document will be described in detail:

The First Embodiment

Figure 3:
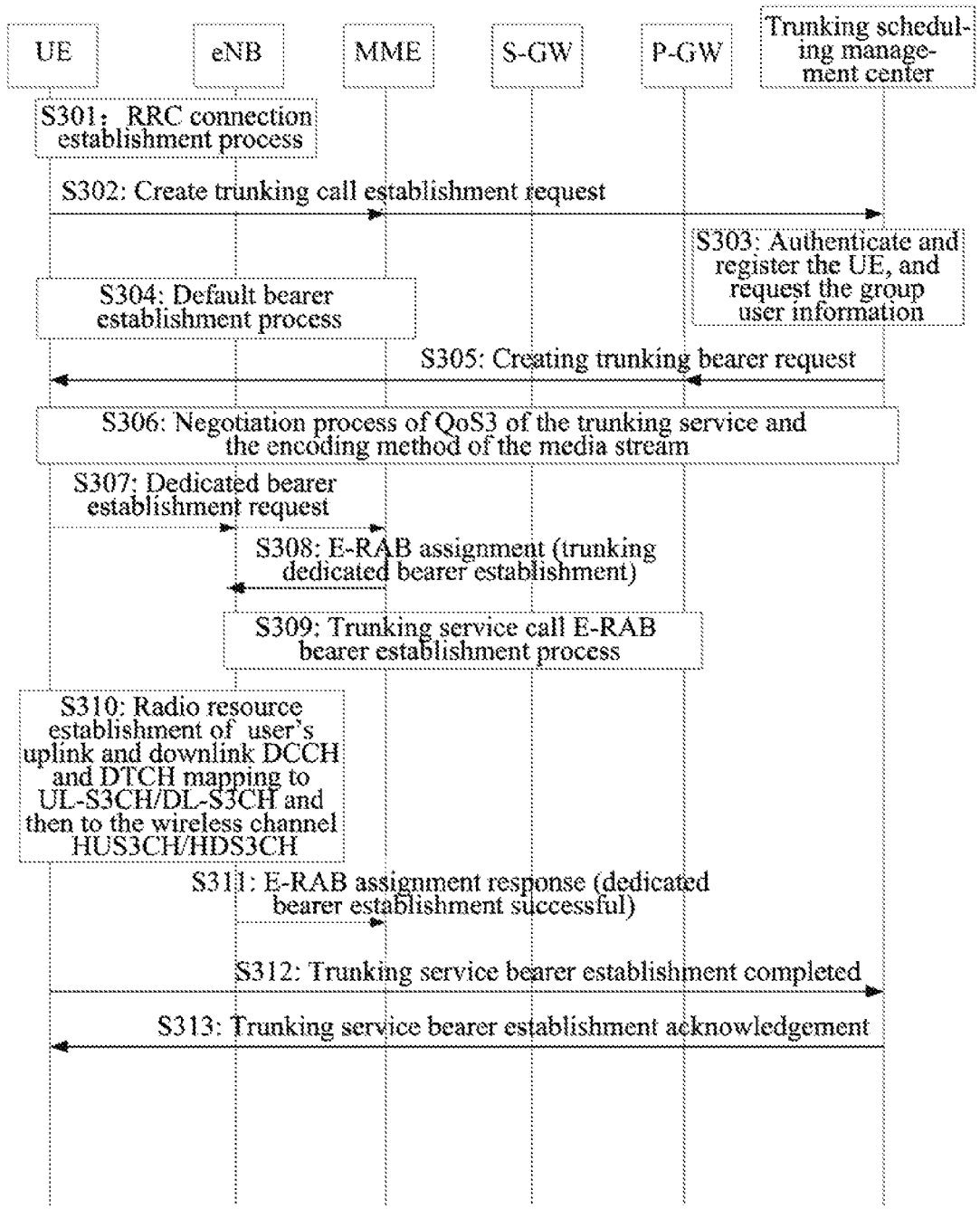
FIG. 3 is a signaling flow chart illustrating a trunking service talking user bearer establishment process in accordance with an embodiment of the present document.

As shown in FIG. 3, it is a signaling flow chart illustrating the trunking service talking user bearer establishment process in accordance with the embodiment of the present document, in which the user equipment (UE) is the user terminal with the talking right, and it requests for a trunking service call establishment request:

S301, the UE and the eNB complete the RRC connection establishment;

S302, the UE initiates and sends a trunking call establishment request (the request information is encapsulated in the NAS message) to the MME through the eNB; said MME identifies the destination address (the control plane interface address of the trunking scheduling management center) of the request information, and forwards the trunking service call establishment request to said trunking scheduling management center;

S303, said trunking scheduling management center authenticates the user that requests the trunking service, and said authentication comprises whether it is a member of the group call or not, whether the registration is successful or not, whether it has the talking application right or not;

S304, after passing the authentication, the trunking scheduling management center encapsulates the trunking service user call information in the creating trunking bearer request according to the playback feature of the trunking service at the wireless network side, and sends the creating trunking bearer request to the network side, and triggers the radio access bearer setup process of the called user within the single call in the unicast mode or the listening users within the group call in the multicast mode;

S305, the UE requests a default bearer establishment (if it is a voice or video service, the default bearer is the SIP/SDP bearer establishment), and the trunking scheduling management center waits until the talking user's default bearer establishment is successful, and then sends the creating trunking bearer request to the user with the talking right;

Its call information comprises: service type, quality of service information, as well as the entity address of the requesting user in the MME; for example, the service type is the narrowband voice such as conversation; the quality of service information comprises: the maximum rate provided for the service is 12.2 kbps, the minimum rate 4.75 kbps; the priority of the service is $3^{rd}$ priority, wherein there are a total of 15 priorities, and $1^{st}$ priority is the lowest;

S306, the UE and the trunking scheduling management center exchange and negotiate the QOS and coding information of the media stream;

S307-308, the UE initiates a trunking service dedicated bearer establishment to the MME; the MME sends the trunking service E-RAB assignment process to the eNB according to its configuration information;

S309-310, after said eNB receives said eRAB assignment, it establishes a S1-U transmission bearer and a radio bearer; the radio bearer uplink and downlink mapping relationship is: logical channel DTCH/DCCH to the transport channel UL-SCH/DL-SCH, and then to the physical channel PUSCH/PDSCH;

S311, after the eNB receives a RRC reconfiguration successful response from the UE, it notifies said MME that the enhanced radio access bearer assignment is completed;

S312, said UE notifies said trunking scheduling management center of a trunking service bearer establishment completed message through the user plane bearer in the access network, and the trunking scheduling management center confirms and updates the trunking service call status information, and updates the status as establishment completed;

S313, the trunking scheduling management center sends the UE a trunking service bearer establishment acknowledgement that carries the call establishment response and the talking right authorization prompt.

The Second Embodiment

Figure 4:
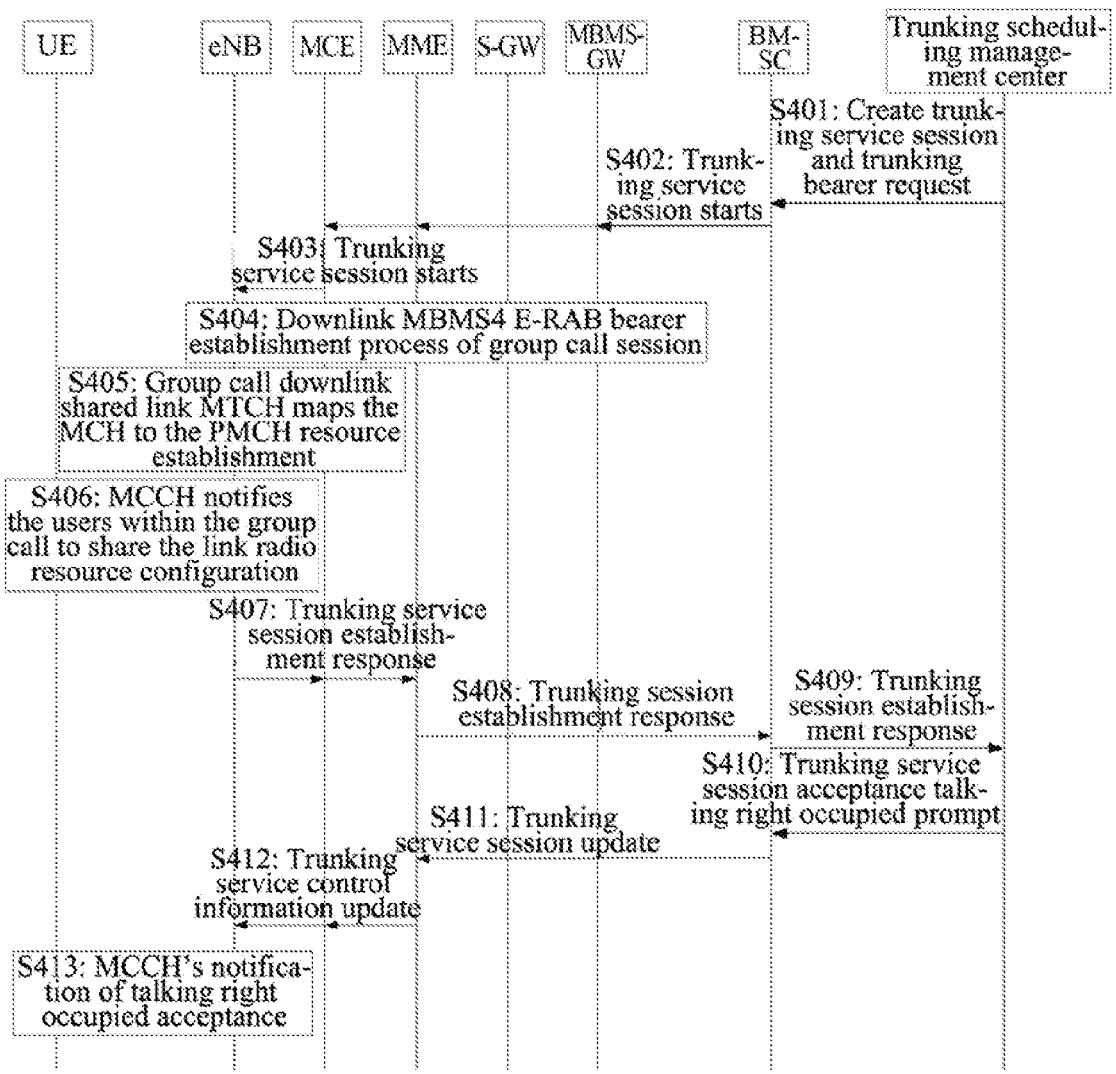
FIG. 4 is a signaling flow chart of a group call's multicast bearer establishment process in the trunking service multicast mode in accordance with an embodiment of the present document.

When a calling user terminal in the first embodiment requests the trunking scheduling management center to establish the trunking service call as a group call, the trunking scheduling management center triggers a radio access bearer setup process in the multicast mode for the listening users within the group call. The eNB is an evolved NodeB in the cell that controls the service area of the trunking service. As shown in FIG. 4, the cooperative management control process between the network elements in the eMBMS based LTE system is:

after the UE and the eNB establish the RRC connection establishment in FIG. 3, the UE initiates and forward a group call establishment request to the trunking scheduling management center by the MME, after the trunking scheduling management center successfully authenticates and registers the user that requests for the group call, it establishes a radio access bearer for the listening users within the group call, and triggers the BM-SC to create a trunking service session.

S401, the trunking scheduling management center encapsulates the call information of the group call into the creating trunking bearer request, and then sends the creating trunking bearer request to the BM-SC; its call information comprises: service type, quality of service information, group call service area, and the entity address of the requesting user in the MME; for example, the service type is the narrowband voice such as conversation; the QOS information comprises: the maximum rate provided for the service is 12.2 kbps, the minimum rate 4.75 kbps; the priority of the service is $3^{rd}$ priority, wherein, there are a total of 15 priorities, and $1^{st}$ priority is the lowest.

The BM-SC generates and carries the trunking service session control signaling and the transmission bearer address into the trunking bearer establishment request and send it to the MBMS-GW;

S402, the MBMS-GW receives the trunking session control request, and the MBMS-GW allocates a multicast address to the session for the eNB applying to join in the multicast, and transmits this information to the MME, and then distribute this information to the MCE by the MME; the MCE allocates the radio resources and the scheduling information of the resources to the trunking service session; and sends a trunking service session request to all of controlled eNBs;

S403-404, all the eNBs that belong to the group call controlling area receive the trunking service session request, and start to establish the downlink E-RAB bearer establishment process;

S405-406, the eNB maps the group call downlink shared channel MTCH to the PMCH radio bearer; and notifies the group call users to configure the downlink shared link radio resource on the MCCH;

S407-408, the eNB sends a trunking service session establishment response to the MCE, and via the MBMS-GW, finally sends the establishment successful to the trunking scheduling management center by the BM-SC;

Herein the "trunking service session establishment response" is a realization form of the "trunking call establishment response"; of course for different systems, said "trunking call establishment response" may have different realization forms;

S409, after the trunking scheduling management center receives the group call multicast link established, with combination of the talking user's bearer establishment successful information, the trunking scheduling management center updates the group call status of the trunking service call, and authorizes and registers the talking user;

S410-412, the trunking scheduling management center sends a call establishment acknowledgement prompt information to the BM-SC, and the BM-SC updates the trunking service session. Said call establishment acknowledgement prompt information comprises: the prompt information for the users within the group call. The trunking service session update information is through MBMS-GW and sent by the MME to the MCE;

the call establishment acknowledgement prompt information is carried in the trunkings service session update information;

S413, the MCE updates and distributes the trunking service session to the eNB that is related with the trunkings service session service area, and the eNB controls to notify the group call prompt information to the listening users in the session group call on the MCCH of each cell. Said prompt information comprises: the talking right occupied information, the priority information of the group call, and so on.

It should be noted that the abovementioned call establishment acknowledgement prompt information has different names for different downlink shared links, for example, it is the group call prompt information in this embodiment.

The Third Embodiment

If the user equipment is a wired scheduling station, when establishing a group call in the trunking service multicast mode, the process of collaborative management control between the network elements in the eMBMS based LTE system is:

the wired scheduling station initiates and forwards a group call establishment request to said trunking scheduling management center via the MME, and after the trunking scheduling management center authenticates and registers the wired scheduling station that requests for the group call, it establishes a radio access bearer for the listening users within the group call, and triggers the BM-SC to create a trunking service session.

The implementation is the same as the steps S401-413 in the second embodiment, and is not repeated here.

The Fourth Embodiment

Figure 5:
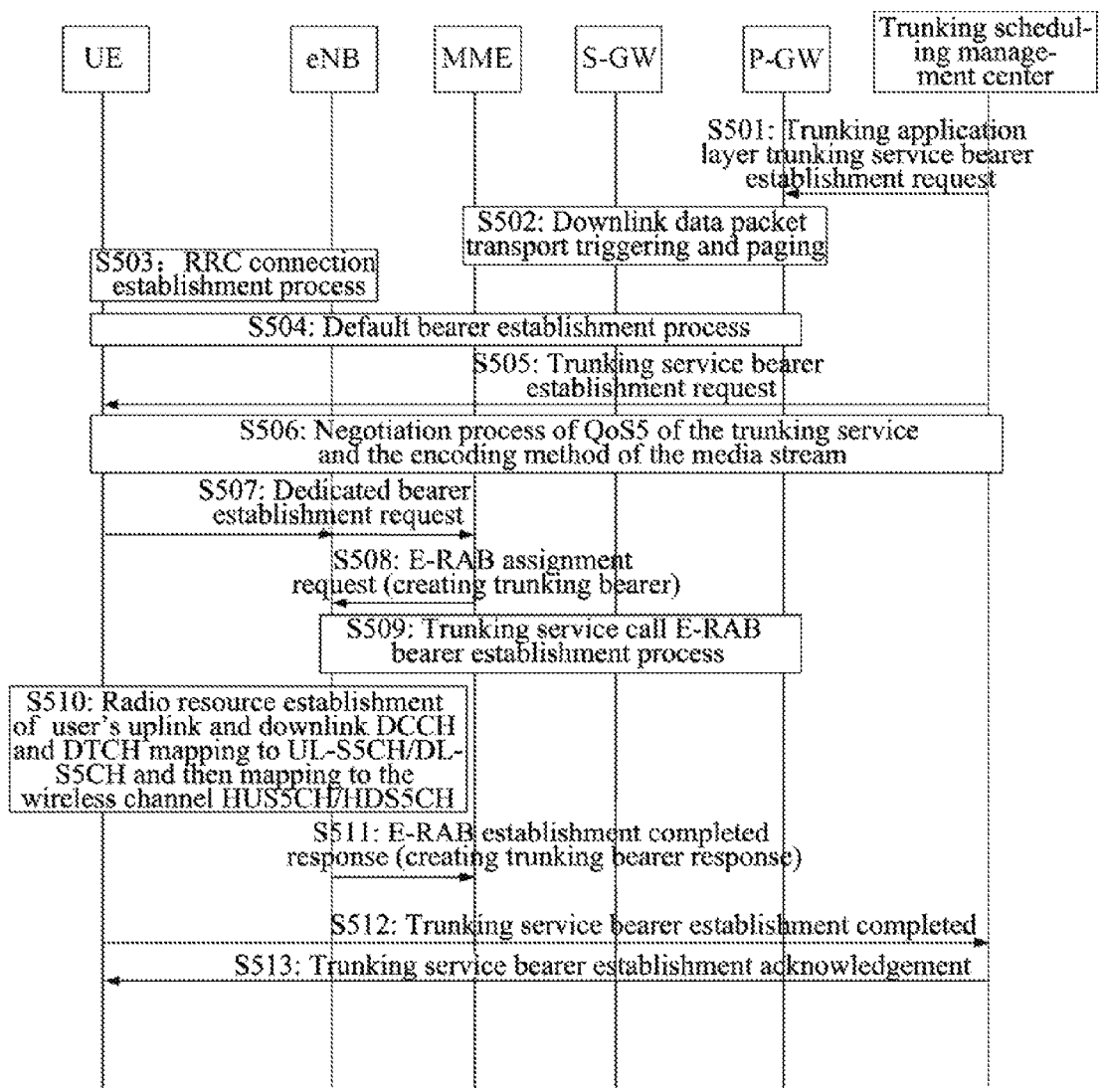
FIG. 5 is a signaling flow chart of an establishment process of the called user in a single call in the trunking service unicast mode in accordance with an embodiment of the present document.

As shown in FIG. 5, after the UE and the eNB establish the RRC connection establishment, the UE initiates and forward a single call establishment request to the trunking scheduling management center via the MME, and after the trunking scheduling management center authenticates and registers the requesting user, it establishes a radio access bearer for the listening users within the single call in the unicast mode, and triggers the core network to page the listening users, the core network acquiring the paging response sends the creating trunking bearer request to the listening user trunking application layer; the listening user initiates the process of requesting the MME to establish the trunking service dedicated bearer; and said process comprises:

S501, when the listening user within the single call (that is, the called user UE) is a wireless mobile device, its radio access bearer establishment is that the trunking scheduling management center triggers the data distribution request of the packet data gateway P-GW in the core network (said data comprises the called user's establishing trunking service call information requested by the trunking scheduling management center);

Wherein the call information comprises: service type, quality of service information, group call service area, and the entity address of the requesting user in the MME; for example, when the service type is streaming; the quality of service information comprises: the maximum rate provided for the service is 256 kbps, the minimum rate 64 kbps; the priority of the service is the $3^{rd}$ priority, and there are a total of 15 priorities, and the $1^{st}$ priority is the lowest.

S502, the P-GW notifies via the Serving Gateway S-GW the MME to page the called user, and the MME initiates a paging to the eNB;

S503-504, the called user UE that receives the paging requests a default bearer establishment (if it is a voice or video service, the default bearer is the SIP/SDP bearer establishment);

S505, after the P-GW waits for the default bearer establishment successful, it sends the trunking service bearer establishment request to the listening user;

S506, the UE and the trunking scheduling management center exchange and negotiate the Qos and coding information of the media stream;

S507-508, the UE initiates a trunking service dedicated bearer establishment to the MME, and the eNB receives an E-RAB assignment request (that is, the creating trunking bearer request);

S509-510, the eNB establishes the S1-U transmission bearer and the radio bearer; the radio bearer uplink and downlink mapping relationship is: the logical channel DTCH/DCCH to the transport channel UL-SCH/DL-SCH and then to the physical channel PUSCH/PDSCH;

S511, after the eNB receives the RRC reconfiguration successful response from the UE, it notifies the MME that the enhanced radio access bearer assignment is completed;

S512, the UE notifies the trunking scheduling management center of the trunking service bearer establishment completed message through the user plane bearer in the access network, the trunking scheduling management center confirms and updates the trunking service call status information, and updates the status as establishment completed;

S513, the trunking scheduling management center sends the UE a trunking service bearer establishment acknowledgement that comprises the trunking call establishment response as well as the talking right authorization prompt.

Those ordinarily skilled in the art can understand that all or some of steps in the abovementioned method may be completed by the programs instructing the relevant hardware, and said programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiment may be realized in the form of hardware or software function module. The embodiment of the present document is not limited to any specific form of hardware and software combinations.

The above embodiments are only used to illustrate but not intended to limit the technical scheme of the present document, and the present document is only described in detail with reference to the preferred embodiments. A person ordinarily skilled in the art should understand that various changes and equivalent replacements can be made for the technical scheme of the present application without departing from the spirit and scope of the technical scheme of the present application, and all these changes and equivalent replacements should be included within the scope of the claims of the present application.

Industrial Applicability

The technical scheme can effectively meet the trunking service bandwidth requirements and improve the transmission efficiency; it well solves problems of interference suppression and interference coordination in networking, and improves the frequency resource utilization; it makes the applications of the trunking communication service expand from the traditional dedicated network to the mobile public network.

What we claimed is:

1. A broadband digital trunking service implementation method, comprising:
   receiving, by a trunking scheduling management center, a trunking call establishment request initiated by a user;
   sending to a network side, by said trunking scheduling management center, a creating trunking bearer request carrying call information and a transmission bearer address according to said trunking call establishment request;
   wherein, sending to a network side, by said trunking scheduling management center, a creating trunking bearer request carrying call information and a transmission bearer address according to said trunking call establishment request, comprises: said trunking scheduling management center, according to said group information carried in said trunking call establishment request, determining a playback feature of single call or group call of a trunking service at said network side and attributes of the user's role in said single call or group call of said trunking service, and sending said creating trunking bearer request carrying said call information and said transmission bearer address to said network side.

2. The method of claim 1, wherein:
   after said trunking scheduling management center sends to said network side said creating trunking bearer request, said method further comprises:
   receiving, by said trunking scheduling management center, a trunking call establishment response sent by said network side, and sending a call establishment acknowledgement prompt information to users in said trunking service group;
   wherein, said call establishment acknowledgement prompt information comprises talking-right occupancy information of said group, priority information of said group and priority information of the user with talking right within said group.

3. The method of claim 1, wherein, said trunking scheduling management center, according to said group information carried in said trunking call establishment request, determining a playback feature of single call or group call of a trunking service at said network side and attributes of the user's role in said single call or group call of said trunking service, and sending said creating trunking bearer request carrying said call information and said transmission bearer address to said network side, comprises:
   authenticating, by said trunking scheduling management center, the user that sends said trunking call establishment request,
   after passing said authentication, determining said playback feature of said single call or group call of said trunking service at said network side, as well as the attributes of said user's role in said single call or group call of said trunking service, and
   configuring a service type and a quality of service (QoS) of said trunking service according to the determined playback feature at the network side as well as the attributes of the user's role, and sending said creating trunking bearer request carrying said QoS information and said transmission bearer address to said network side.

4. A broadband digital trunking service implementation method, comprising:
   receiving, by a network side, a creating trunking bearer request sent by a trunking scheduling management center, and sending said creating trunking bearer request to a user with talking right in a group;
   receiving, by said network side, a trigger request sent by said trunking scheduling management center, and establishing, by said network side, a dedicated or shared radio access bearer for all listening users in said group according to said trigger request;
   wherein, establishing, by said network side, a dedicated or shared radio access bearer for all listening users in said group according to said trigger request, comprises:
   establishing, by said network side, a dedicated radio access bearer for listening users in a single call according to said trigger request; or
   establishing, by said network side, a downlink shared radio access bearer for listening users in a group call according to said trigger request.

5. The method of claim 4, wherein,
   after said network side establishes a dedicated or shared radio access bearer for all said listening users in said group according to said trigger request, said method further comprises: sending, by said network side, a trunking call establishment response to said trunking scheduling management center.

6. A trunking scheduling management center, comprising:
   a receiving module, configured to receive a trunking call establishment request initiated by a user; and
   a processing module, configured to, according to said trunking call establishment request, send to a network side a creating trunking bearer request carrying call information and a transmission bearer address by the following way:
according to said group information carried in said trunking call establishment request, determining a playback feature of single call or group call of a trunking service at said network side and attributes of the user's role in said single call or group call of said trunking service, and sending said creating trunking bearer request carrying said call information and said transmission bearer address to said network side.

7. The trunking scheduling management center of claim 6, wherein:
said receiving module is further configured to receive a trunking call establishment response sent by said network side;
said processing module is further configured to send a call establishment acknowledgement prompt information to users in said single call or group call of said trunking service;
wherein: said call establishment acknowledgement prompt information comprises talking right occupancy information of said group, priority information of said group and priority information of the talking user within said group.

8. The trunking scheduling management center of claim 6, wherein, said processing module is further configured to:
authenticate the user that sends said trunking call establishment request,
after passing said authentication, determine said playback feature of said single call or group call of said trunking service at said network side, as well as the attributes of said user's role in said single call or group call of said trunking service, and
configure a service type and a quality of service (QoS) of said trunking service according to the determined playback feature at the network side as well as the attributes of the user's role, and send said creating trunking bearer request carrying said QoS information and said transmission bearer address to said network side.

9. A broadcast multicast service center (BM-SC), comprising:
a converting module, configured to receive a creating trunking bearer request sent by a trunking scheduling management center, and convert quality of service (QoS) information carried in said creating trunking bearer request into said trunking service's QoS information identifiable by a mobility management entity (MME);
a processing module, configured to generate a trunking service session control signaling and a transmission bearer address of a group call downlink in a multicast mode, and carry said trunking service session control signaling and said transmission bearer address into said creating trunking bearer request, and then send said request to said MME through a multimedia broadcast/multicast service gateway (MBMS-GW).

10. The BM-SC of claim 9, wherein,
said processing module is further configured to: receive a trunking call establishment response from said MME, and return said trunking call establishment response to said trunking scheduling management center; and
said processing module is further configured to: receive a call establishment acknowledgement prompt information returned by said trunking scheduling management center, and send said call establishment acknowledgement prompt information to said MME via said MBMS-GW.

11. A mobility management entity (MME), comprising:
an interface module, configured to forward a trunking call establishment request from a user equipment to a trunking scheduling management center, and forward a creating trunking bearer request that carries quality of service information and is from said trunking scheduling management center to an evolved NodeB and said user equipment via a broadcast multicast service center (BM-SC);
a configuring and sending module, configured to: receive a trigger request sent by said user equipment after accepting said creating trunking bearer request, and configure transmission bearer information according to said trigger request, and convert said quality of service information into quality of service information identifiable by said evolved NodeB, and send to said evolved NodeB a radio access bearer establishment request carrying said quality of service information identifiable by said evolved NodeB and said transmission bearer information.

12. The MME of claim 11, wherein: said configuring and sending module is further configured to: if said user equipment is a user equipment of listening users in a group call in a multicast mode, send said radio access bearer establishment request to said evolved NodeB through a multi-cell/multicast coordination entity (MCE); if said user equipment is a wireless mobile device of a talking user in said group or a user equipment of listening users within a single call in the unicast mode, directly send said radio access bearer establishment request to said evolved Node.

13. The MME of claim 11, wherein, said interface module is further configured to:
forward to the BM-SC via a multimedia broadcast/multicast service gateway (MBMS-GW) a trunking call establishment response which is from said evolved NodeB, and send to said evolved NodeB through said MCE a call establishment acknowledgement prompt information which is from said trunking scheduling management center.

14. A multi-cell/multicast coordination entity (MCE), comprising:
a distributing module, configured to, after receiving a radio access bearer establishment request sent by a mobility management entity (MME), allocate radio resources and scheduling information of said radio resources to a trunking service session; and
a sending module, configured to: send said radio access bearer establishment request to all evolved NodeBs controlled by said MCE;
wherein, said sending module is further configured to: receive a call establishment acknowledgement prompt information from said MME, and send said call establishment acknowledgement prompt information to each evolved NodeB to which a current trunking service session service area belongs.

15. An evolved NodeB, comprising:
an interface module, configured to receive a radio access bearer establishment request that carries quality of service information identifiable by said evolved NodeB and a transmission bearer information and is sent by a mobility management entity (MME); and
an establishing module, configured to, according to said radio access bearer establishment request received by said interface module, establish a radio access bearer;

wherein, said interface module is further configured to: receive a call establishment acknowledgement prompt information from said MME, and on a multicast control channel (MCCH), notify all users in a group call of said call establishment acknowledgement prompt information, wherein said call establishment acknowledgement prompt information comprises talking right occupied information, talking right idle information, priority information of the user with talking right, and priority information of said group.

16. The evolved NodeB of claim 15, wherein: said establishing module is further configured to,
when said evolved NodeB is an evolved NodeB of a group call area in a multicast mode, establish a downlink shared radio access bearer for said group call, wherein said downlink shared radio access bearer comprises a M1 interface transmission bearer and a radio bearer; map a control plane and a user plane of said radio bearer to logical channels:
multicast control channel (MCCH) and multicast traffic control (MTCH) respectively, and then via said logical channels to a multicast control channel (MCH), and finally to a physical multicast channel (PMCH);
when said evolved NodeB is an evolved NodeB to which a cell in which a user with the talking right in said group or a listening user in a unicast mode is located belongs, establish an uplink and downlink, and said uplink and downlink comprise a S1 interface transmission bearer and a radio bearer, and map the control plane and the user plane of said radio bearer to an uplink logical channels: dedicated control channel (DCCH) and dedicated traffic channel (DTCH), and then map said uplink logical channels DCCH and DTCH to the uplink shared channel (UL-SCH), and finally map to the physical uplink shared channel (PUSCH); correspondingly, map said downlink logical channels DCCH and DTCH to a downlink shared channel (DL-SCH), and finally map to a physical downlink shared channel (PDSCH);
wherein: said interface module is further configured to, after said establishing module establishes said radio access bearer, send a trunking call establishment response to said MME.

17. A multimedia broadcast/multicast service gateway (MBMS-GW), comprising:
an interface module, configured to receive a trunking call establishment request sent by a broadcast multicast service center (BM-SC), and send a creating trunking bearer request carrying a multicast address to a mobile management entity (MME); and
a distributing module, configured to, according to said creating trunking bearer request from said BM-SC, allocate the multicast address for a session;
wherein, said interface module is further configured to send a trunking call establishment response to said BM-SC, and send to said mobile management entity (MME) a call establishment acknowledgement prompt information which is from said BM-SC.

18. The MBMS-GW of claim 17, wherein,
said interface module is further configured to: send data from said BM-SC to each evolved NodeB to which a current trunking service session service area belongs, wherein, said data is a media stream that belongs to a user with talking right in the group call and is sent to a trunking scheduling management center.

* * * * *